(12) United States Patent
Miguel et al.

(10) Patent No.: US 10,537,120 B2
(45) Date of Patent: Jan. 21, 2020

(54) LYOTROPIC COMPOSITION OF CARBOHYDRATES IN FATS, METHOD FOR OBTAINING IT AND APPLICATION THEREOF IN THE PREPARATION OF CHOCOLATE AND SUBSTITUTES

(71) Applicant: NATRA CACAO, S.L. UNIPERSONAL, Valencia (ES)

(72) Inventors: José Fernando Galdón Miguel, Valencia (ES); Miguel Ángel Puente Tomas, Valencia (ES); Arturo Fernando Mascarós Torres, Valencia (ES); Susana Méndez Plaza, Valencia (ES)

(73) Assignee: NATRA CACAO, S.L. UNIPERSONAL, Valencia (ES)

( * ) Notice: Subject to any disclaimer, the term of this patent is extended or adjusted under 35 U.S.C. 154(b) by 0 days.

(21) Appl. No.: 15/682,300

(22) Filed: Aug. 21, 2017

(65) Prior Publication Data

US 2017/0339974 A1 Nov. 30, 2017

Related U.S. Application Data

(62) Division of application No. 13/489,614, filed on Jun. 6, 2012, now abandoned.

(30) Foreign Application Priority Data

Jun. 7, 2011 (EP) ..................................... 11382188

(51) Int. Cl.
| | | |
|---|---|---|
| A23G 1/40 | (2006.01) |
| A23L 5/00 | (2016.01) |
| A23L 21/00 | (2016.01) |
| A23L 29/10 | (2016.01) |
| A23L 29/30 | (2016.01) |
| A23G 1/36 | (2006.01) |
| A23G 1/56 | (2006.01) |
| A23D 9/00 | (2006.01) |

(52) U.S. Cl.
CPC ................. *A23G 1/40* (2013.01); *A23D 9/00* (2013.01); *A23G 1/36* (2013.01); *A23G 1/56* (2013.01); *A23L 5/00* (2016.08); *A23L 21/00* (2016.08); *A23L 29/10* (2016.08); *A23L 29/30* (2016.08); *A23V 2002/00* (2013.01)

(58) Field of Classification Search
None
See application file for complete search history.

(56) References Cited

U.S. PATENT DOCUMENTS

| | | | |
|---|---|---|---|
| 3,928,648 A | 12/1975 | Stahl et al. | |
| 4,045,583 A | 8/1977 | Jeffrey et al. | |
| 4,889,739 A * | 12/1989 | Powers | A23L 2/06 426/599 |
| 5,106,644 A | 4/1992 | El-Nokaly | |
| 5,120,566 A * | 6/1992 | Baba | A23G 1/305 426/631 |
| 5,425,957 A | 6/1995 | Gaim-Marsoner et al. | |
| 5,468,509 A | 11/1995 | Schlup et al. | |
| 5,474,795 A | 12/1995 | Surber et al. | |
| 5,518,754 A | 5/1996 | Miller et al. | |
| 5,776,536 A * | 7/1998 | Tremblay | A23G 1/30 426/593 |
| 5,968,583 A | 10/1999 | Gautchier et al. | |
| 6,143,345 A | 11/2000 | Gonze et al. | |
| 2006/0121175 A1 * | 6/2006 | Hanselmann | A23G 1/32 426/631 |
| 2007/0224323 A1 | 9/2007 | Goldman | |
| 2008/0248183 A1 | 10/2008 | Brown | |
| 2009/0304867 A1 * | 12/2009 | Rabault | A23G 1/305 426/61 |
| 2012/0315357 A1 | 12/2012 | Miguel et al. | |

FOREIGN PATENT DOCUMENTS

| | | |
|---|---|---|
| CA | 2649936 | 7/2010 |
| EP | 2532248 A1 | 12/2012 |

OTHER PUBLICATIONS

Jeffrey: FR2318589; Composition Comestible Et Son Procede De Preparation; published Feb. 18, 1977. (Year: 1977).*
Chun: KR 2004081928; Sep. 23, 2004. (Year: 2004).*
Beckett: The Science of Chocolate; copyright 2008. (Year: 2008).*
Schumacher: Development and evaluation of a laboratory scale conch for chocolate production; International Journal of Food Science and Technology 2009, 44, 616-622 doi:10.1111/j.1365-2621.2008.01877.x_2009. (Year: 2009).*
Ermakova: SU 527181A; Jun. 22, 1977 (Year: 1977).*
Zhu (Effects of the processing steps on chlorpyrifos levels during honey production; Food Control 21 (2010) 1497-1499. (Year: 2010).*
FR 2318589: published Feb. 18, 1977. (Year: 1977).*
U.S. Pat. No. 4,045,583; best English translation of FR 2318589; published Aug. 30, 1977. (Year: 1977).*
Norton: WO2010146350A1; published: Dec. 23, 2010 (Year: 2010).*
Afoakwa: Factors influencing rheological and textural qualitites in chocolate: A review; Trends in Food Science & Technology 18; 2007; 290e298.
Cacao Nibs, 1 oz. Nutrition Facts & Calories; http://nutritiondara.self.com/facts/custom/933596/2.
Dictionary.com: Fruit; The American Heritage® Idioms Dictionary Copyright © 2002, 2001, 1995 by Houghton Mifflin Company. Published by Houghton Mifflin Company.
Nathalie: 2 Ingredient Raw Confections: Chocolate, published online: published Sep. 25, 2010 at: http//www/nathalielawhead.com/candybox/2-ingredient-raw-confections-balls.

(Continued)

*Primary Examiner* — Patricia A George
(74) *Attorney, Agent, or Firm* — Cantor Colburn LLP

(57) ABSTRACT

A lyotropic composition related to the food industry field, and particularly to the chocolate industry field is described. Specifically, a lyotropic composition comprising carbohydrates in fats is described. Also described is a method for producing the lyotropic composition. Moreover, different uses of said composition, particularly for the manufacture of chocolates and chocolate substitutes, including chocolate with honey and fruity chocolate are described.

8 Claims, No Drawings

(56) References Cited

OTHER PUBLICATIONS

NHB: Carbohydrates and the sweetness of honey; Natinal Honey Board; published online at least by Dec. 27, 2010 at: http://web.archive.org/web/20101227122814/http://www.honey.com/images/downloads/carb.pdf.
Norton: Development and charaterisation of tempered cocoa butter emulsions containing up to 60% water; Journal of Food Engineering; 2009; 95; 172-178.
Parris et al "Triglyceride Microemulsions: Effect of Nonionic Surfactants and Thenature of the Oil"; 1994; Journal of Agricultural and Food Chemistry; American Cancer Society; US; vol. 42, No. 6; pp. 1295-1299; XP000453335.
Peanut Butter—Wikipedia; USDA: https:www.google.com/search?q=protein+in+peanut+butter&sourceid=ie7$rls=com.microsoft:en-us:IE-SeacrhBox&ie=&oe=#q=protein+in+peanut+butter&rls=com.microsoft:en-us:IE-SearchBox.
SND: Self Nutritional Data: Candies, chocolate, dark, 70-85% cacao solids; published online at least by Jul. 30, 2010 at http://web.archive.org/web/20100730124235/http://nutritiondata.self.com/facts/sweets/10638/2.
Solos: Beet Sugar v. Cane SUgar Aug. 2010; http://www.archive.org/web/20100818071430/http:www.home-ec101.com/beet-sugar-v-cane-sugar-august-2010/.

\* cited by examiner

LYOTROPIC COMPOSITION OF CARBOHYDRATES IN FATS, METHOD FOR OBTAINING IT AND APPLICATION THEREOF IN THE PREPARATION OF CHOCOLATE AND SUBSTITUTES

TECHNICAL FIELD

The present application belongs to the food industry field, and particularly to the chocolate industry field. More specifically, the invention relates to a lyotropic composition of carbohydrates in fats and the method for producing it. Moreover, the invention consists of different uses of said composition in the food industry. Finally, the process for preparing chocolate or chocolate substitutes from the lyotropic composition of the invention and the product obtained, particularly chocolate with honey and fruity chocolate, are also an object of the present invention.

BACKGROUND

Different ingredients are used in the process of preparing chocolate, being cocoa powder, cocoa butter, cocoa paste, cocoa butter equivalent fats, sugar and emulsifier conventionally used. Additionally, there are other additional ingredients which can be added, as long as the Directive 2000/36/EC of the European Parliament and of the Council of 23 Jun. 2000 relating to cocoa and chocolate products intended for human consumption is fulfilled. Said Directive specifies the ingredients and proportions thereof in the different types of chocolates. These different types of chocolate are defined in Annex I of said Directive. This Directive also indicates that the addition of animal fats and their preparations which are not exclusively derived from milk, as well as the addition of flavoring agents which mimic the taste of chocolate or of milk fat, are prohibited.

The sugars most used in the manufacture of chocolate and substitutes are sucrose (also called saccharose), lactose (in milk chocolate) and polyalcohols. Sucrose is a disaccharide formed by two sugars (monosaccharides), glucose and fructose, chemically bound together. Lactose is also a disaccharide and is formed by the combination of glucose and galactose.

All these sugars are in crystalline form, however, sugar also exists is a non-crystalline amorphous form. This occurs, for example, when sucrose solutions are dried too quickly and there is no time for the individual molecules to form a crystalline structure as the water is removed. Sugar in amorphous form is an important factor to be taken into account in the manufacture of chocolate since it can affect the taste and the fluidity properties of liquid chocolate. The surface of amorphous sugar is very reactive and can easily adsorb any taste/flavor surrounding it. Thus, for example, if sugar is ground together with cocoa, some of the volatile compounds of the cocoa can be adsorbed by the amorphous sugar instead of escaping to the atmosphere, which will result in a chocolate with a more intense taste. However, the amorphous state is unstable and in the presence of water it is transformed into a crystalline material. Once said change has occurred, free water remains which is absorbed by the sugar molecules and makes them to bind to one another forming aggregates, which confer a gritty texture to the chocolate (undesirable). Furthermore, moistened sugar has a high risk of being microbiologically contaminated.

Although glucose and fructose linked together form the disaccharide saccharose, these monosaccharides are normally not used per se in the manufacture of products in which the process for their preparation requires mixing polar and apolar substances, such as the preparation of chocolate. Glucose, also known as dextrose, crystallizes as a monohydrate, is very difficult to dry completely and is very hygroscopic. Likewise, fructose, which is naturally present in fruits and in honey, is also very hygroscopic. This hygroscopicity of both molecules hinders its use in the manufacture of chocolate since the moisture which both molecules absorb from the air surrounding them makes liquid chocolate very viscous, since said moisture favors the binding of the sugar particles to one another. This high viscosity hinders the handling of said chocolate in liquid state and makes very special processing conditions be required, especially in terms of temperature and moisture, which increases the cost of the chocolate manufacturing process using said sugars. Another problem also arises in the refining of glucose, because its crystallization water content is released at 65° C. Even when refining temperatures lower than these are measured, at the time of applying pressure, temperatures releasing crystallization water are produced. Fructose is even more susceptible to pressure. This is one of the main reasons for which it is difficult to produce chocolate with a fructose base.

In this respect, the present invention achieves the introduction in the chocolate manufacturing process of rarely used sugars such as, among others, glucose and fructose. It thus provides broad alternatives to the chocolate industry, allowing the manufacture of chocolates with sugars from, for example, fruits or honey, and without resulting in an increase of the cost of the manufacturing process.

Honey is a food with a high energy value (~337 Kcal/100 g) and with an easy digestion since it is almost exclusively made up of simple sugars, which do not require transformations and are directly assimilated, in addition to glucose and fructose, provides other compounds such as vitamins, proteins, mineral salts, etc, which are essential for the good functioning of the organism. Therefore, the consumption of honey is more recommendable than that of sugar.

Fruit has, in turn, an undeniable reputation from the nutritional and functional point of view, which will result in a better positioning of the chocolates obtained from fruit sugars (object of the present invention) compared with those prepared from purified and crystallized sugars. Since soluble fruit fractions are used among the main components thereof, fructose will be present at a higher concentration. This may be interesting because fructose is one of the sugars with the lowest glycemic index and it has been massively used for years in diets for diabetics and its use is authorized as a sugar-substituting natural sweetener.

On the other hand, there are many studies focused on achieving the incorporation of water in chocolate, among other reasons, to reduce the calorie content of chocolate. However, despite the extensive research conducted in this field, and the multiple patents relating to said incorporation of water, there are few satisfactory results in relation to the quality and organoleptic characteristics of the chocolate obtained. Thus, for example, it should be emphasized those which use emulsion as the route for incorporating water, as is the case of U.S. Pat. No. 5,120,566 (Baba et al., 1992), which describes a method for manufacturing chocolate with water, by directly mixing the chocolate with an aqueous ingredient, after rolling and conching, and emulsifying it with a nut paste to achieve a water-in-oil (W/O) emulsion. However, and unlike the chocolate obtained by means of the present invention, the chocolate obtained by this method does not have a crispy nature like conventional chocolate and is instead comparable to a chocolate cream (Beckett, 2000). Moreover, U.S. Pat. No. 5,468,509 (Schlup and Lioutas, 1995) describes a process for preparing milk chocolate with a water content of 1-16% by weight, in which the cocoa and the aqueous ingredient are mixed until obtaining a homogeneous mixture. The product obtained by means of this process has a plastic, homogeneous appearance, its fracturability and hardness being suitable with respect to conventional chocolate, although the product in liquid state behaves like a viscoelastic fluid, its viscosity and fluenciy limit being too high to be incorporated into the conventional process for preparing chocolate, which makes it uninteresting from the industrial point of view.

Taking into account these last technical problems, the present invention describes a composition through which the incorporation in the chocolate of both water and sugars rarely used in the process for preparing chocolate is achieved both at laboratory scale and at industrial scale. These objectives are achieved with the composition object of the invention, which is a lyotropic composition of carbohydrates in fats (hereinafter referred to as lyotropic composition) characterized in that it comprises at least a polar phase, a fatty phase and a surface-active agent. In relation to the processes for incorporating the carbohydrates in a nonpolar medium such as fats, several techniques have been described in the state of the art. In industry, micronizations of the sugars are normally carried out, which sugars are dispersed in the fats and subsequently stabilized by means of tempering. Nevertheless, practice has demonstrated that achieving particle size within a narrowly defined spectrum defined between 6 and 30 µm is extremely difficult even when the grinding process is combined with a separation/classification step. When these degrees of fineness are not achieved, these dispersions are generally unstable and end up causing the decantation of the dispersed colloids. Another method for incorporating polar substances in non-polar substances is emulsion, however, emulsions are thermodynamically unstable (Salager et al. 2001).

Unlike emulsions, the composition of the present invention is stable and can therefore be stored without agitation both at room temperature (approximately 25° C.) and in refrigeration conditions (4-10° C.). In the context of the present invention, a composition is understood to be stable when no physical, chemical or microbiological change reducing the quality of the composition is observed for a given time period (time determined by the starting fat or fats of the fatty phase). Furthermore, it should be emphasized that in the present invention the emulsion can occur as an intermediate step for the formation of the lyotropic composition, which allows the lyotropic composition to behave as a liquid crystal.

A liquid crystal is a material having at least one intermediate phase between the isotropic liquid phase and the crystalline solid phase, according to the temperature and/or the concentration of its components in a determined solvent. Said phase is also called mesophase and, therefore, the liquid crystal is referred to as mesogenic. In this type of intermediate states, the molecules lack the positional order of a crystal, but are ordered orientationally. They are thus fluid phases with anisotropic properties. The molecules of mesogenic materials usually have a determined geometry facilitating the molecular packing in said anisotropic phases. The ordering is never perfect and only occurs at moderate temperatures, in which thermal agitation is not intense enough to destroy the liquid crystal structure.

Two types of liquid crystals can be distinguished. Thermotropic liquid crystals, the phase diagram of which depends only on the temperature, and the lyotropic liquid crystals, in which in addition to the temperature, the concentration of the compound in a solvent makes the phase diagram vary. In the case of lyotropic liquid crystals, the constituent molecules are usually amphiphilic, with a polar group which dissolves in water and a hydrophobic apolar chain. Thus, the systems with a surface-active agent mainly form mesophases of the lyotropic liquid crystal type, as is the case of the object of the present invention.

The lyotropic composition of the present invention is an at least ternary system comprising, for example, food fat-tensoactive-carbohydrates, which is obtained by means of adjusting the conditions of the synthesis process: pressure and temperature, to determined concentrations of the elements forming the ternary system. The ideal point of concentration of the constituent elements is reached by means of removing by evaporation the excess solvent present in the initial polar phase. The behavior of the resulting lyotropic composition is very similar, generally speaking, to that of the original fat, so the same types of storages, tanks and machinery can be used for its application.

Moreover, another important advantage of the lyotropic composition object of the present invention is that the carbohydrate source may be impure, containing other components different from carbohydrates, such as minerals, vitamins, amino acids, essential oils, fibers, etc., which the carbohydrate source can contain.

In relation to the flavors, many works have been carried out to understand the contribution of the components in the flavor and taste of the chocolate, also the notes have been classified as positive or negative in the sensory context of chocolate, the note of honey being very desirable. This note is present in cocoa in a very low dilution factor. A series of components related to this note have been identified in cocoa: 2-phenylethanol, phenylacetaldehyde, 2-phenylethyl acetate, 2,3,5-trimethyl-6-ethylpyrazine, 2-carboxyaldehyde-1H-pyrrole, furancarboxaldehyde, furfuryl alcohol and 2,5-dimethyl-4-hydroxy-3(2H)-furanone. A chocolate with a greater honey flavor has not been achieved up until now, however, the chocolate prepared from the lyotropic composition of the invention (using honey as the carbohydrate source) considerably increases the notes of honey in the final chocolate.

The lyotropic composition solves the problem of the introduction in the chocolate of natural flavors, whether they are single-variety or multi-variety flavors. By means of conventional processes it would not be excessively difficult to add natural flavors when the flavor is determined by a character impact compound, such as for example banana flavor (isopentyl acetate) or grape flavor (methylanthranylate). It is more difficult when the flavor is determined by several few compounds, such as apple flavor (ethyl-2-methylbutyrate, hexanal, trans-2-hexenal) and raspberry flavor (1-(p-hydroxyphenyl)-3-butanone, cis-3-hexen-1-ol, damascenone, α-ionone, β-ionone), and virtually impossible when the flavor can only be satisfactorily reproduced with a large number of compounds, representative examples are passion fruit flavor (ethyl butyrate, ethyl hexanoate, hexyl butyrate, hexyl hexanoate and peach flavor γ-lactone (C6, C8, C10), δ-lactone (C10), several esters, alcohols, acids, benzaldehydes) and strawberry flavor the aroma of which depends on several hydrocarbons, alcohols, aldehydes and ketones, acids, esters, sulfur compounds, etc. However, with the lyotropic composition of the present invention it is possible to obtain chocolates with fruit flavors the aroma of which would be difficult to obtain by means of flavoring with natural flavors, among others, strawberry and passing fruit.

OBJECT OF THE INVENTION

An object of the present invention is a lyotropic composition of carbohydrates in fats characterized in that it is stable between 4° C. and 25° C. and comprises a fat or a mixture of several fats for food use, the melting point of which is less than 50° C., a carbohydrate content greater than 40% by weight, a concentration of surface-active agents of 0.01 to 4% by weight and a moisture of 2 to 10%, the percentages by weight referring to the final product.

The process for obtaining said lyotropic composition is also object of the present invention, which process is characterized in that it comprises the following steps:
  a) preparing a polar phase comprising a carbohydrate solution and optionally a polar solvent,
  b) preparing a fatty phase from a fat or a mixture of several fats for food use,
  c) mixing the fatty phase and the polar phase by means of agitation at between 20-700 rpm, at a temperature between 30° C. and 50° C. and for between 30 seconds and 36000 seconds,
  d) removing the solvent from the product of phase c) by evaporation under vacuum at a pressure less than 300 mbar, at a temperature less than 65° C. and with agitation at between 10 and 200 rpm, and
  e) adding a surfactant acting as an emulsifier to the product obtained in step d),
wherein either the polar phase or the fatty phase comprises one or several surfactants for food use.

Additionally, the use of the lyotropic composition of the invention as an intermediate in the production of different food products is an object of the present invention, particularly in the preparation of chocolate or chocolate substitutes.

Finally, the method for incorporating the lyotropic composition of the invention in the process for preparing the chocolate or chocolate substitutes is an object of the present invention. Said method is characterized by comprising the following phases:
  A) preparing the lyotropic composition of the invention,
  B) mixing for 20-30 minutes, at 40-50° C. and at 30-50 rpm, the lyotropic composition with chocolate, or with the ingredients of chocolate, except the sugars, ground and/or refined.

DETAILED DESCRIPTION

The basis of this patent has consisted of incorporating up to 83% by weight of carbohydrates (polar substances) from natural sources with high fructose and glucose contents, in a fatty matrix, preferably in a conventional butter matrix. Thus, one of the objects of the present invention is a lyotropic composition of carbohydrates in fats characterized in that it is stable between 4° C. and 25° C. and comprises a fat or a mixture of several fats for food use, the melting point of which is less than 50° C., a carbohydrate content greater than 40% by weight, a concentration of surface-active agents of 0.01 to 4% by weight and a moisture of 2 to 10%, the percentages by weight referring to the final product.

Throughout the specification, the percentages by weight are expressed based on the final lyotropic composition, unless otherwise indicated.

In the context of the present invention, a composition is understood to be stable when no physical, chemical or microbiological change reducing the quality thereof is observed for a given time period. Said period is determined by the starting fat, in the sense that it will be that time in which the quality of the starting fat is maintained, from the physical, chemical and microbiological point of view.

In the context of the invention, the mentioned carbohydrates refer to organic molecules formed by oxygen, carbon and hydrogen, particularly sugars, such as mono-, di- and trisaccharides, and polyalcohols (they have the general formula $C_nH_{(2n+2)}O_n$ and are also referred to as alcoholic sugars, for example maltitol, lactitol, etc.). Said carbohydrates are directly obtained from a natural source or from vegetable extracts, mainly raw or purified fractions of carbohydrates. Likewise, the carbohydrates can come from unpurified vegetable sources, unpurified animal sources, unpurified mixed sources or mixtures thereof. However, the carbohydrates from enzymatic or chemical hydrolysis and subsequently crystallized or taken to dryness are not included as carbohydrates in the terms of the present invention. Thus, the presence of flavors and part of the constituents other than carbohydrates (vitamins, minerals, amino acids, etc.) of the carbohydrate source (fruit, honey, etc) is assured.

In a particular embodiment of the invention, the carbohydrates comprise glucose, fructose, saccharose, polyalcohols and/or other sugars applicable in the preparation of chocolate.

In a particular embodiment of the invention, the carbohydrate content in the lyotropic composition is of between 40% and 83% by weight and such carbohydrates are obtained from vegetable sources, animal sources, mixed sources or mixtures thereof. In another particular embodiment the carbohydrate content is greater than 45% by weight and said concentration is preferably greater than 70% by weight. In another particular embodiment, the vegetable carbohydrate is a type of fruit or several types of fruit and the mixed carbohydrate source is monofloral or multifloral honey.

The lyotropic composition of the invention can further comprise up to 3% by weight of compounds other than carbohydrates but present in the source from which the carbohydrates come, such as, among others, minerals, vitamins, essential oils, fiber, aromatic compounds, amino acids and/or proteins. In a particular embodiment, said compounds are at a concentration less than 1% and in another particular embodiment at a concentration less than 0.3% by weight.

In a particular embodiment of the invention, the fatty phase comprises fats of a vegetable origin in a proportion of 14 to 55% by weight.

In relation to the tensoactives (also referred to as surfactants), those used in the present invention are generally used in the food industry and commonly known by the person skilled in the art, the most recommendable ones being: lipoproteins, phospholipids, monoglycerides and diglycerides, propylene glycol esters of fatty acids, glyceride esters of fatty acids, sorbitan esters, lecithin, sucroglycerides, sucroesters, polyglycerol polyricinoleate or mixtures thereof. In a particular embodiment, the concentration of surfactants is of 0.5 to 1.6% by weight.

In relation to the moisture, in a particular embodiment, the moisture of the lyotropic composition is of 3 to 7%, in another particular embodiment it is of 3 to 5% and in another particular embodiment it is of 3 to 4.5%.

In a particular embodiment the lyotropic composition of the invention comprises a carbohydrate content greater than 45% by weight, it has a moisture of 3% to 7% and a surfactant content of 0.5% to 1.6% by weight.

On the other hand, the process for obtaining the lyotropic composition of the invention is also an object of the present invention, which process is characterized in that it comprises the following steps:
a) preparing a polar phase comprising a carbohydrate solution and optionally a polar solvent,
b) preparing a fatty phase from a fat or a mixture of several fats for food use,
c) mixing the fatty phase and the polar phase by means of agitation at between 20-700 rpm, at a temperature between 30° C. and 50° C. and for between 30 seconds and 36000 seconds,
d) removing the solvent from the product of phase c) by evaporation under vacuum at a pressure less than 300 mbar, at a temperature less than 65° C. and with agitation at between 10 and 200 rpm, and
e) adding a surfactant acting as an emulsifier to the product obtained in step d), wherein either the polar phase or the fatty phase comprises one or several surfactants for food use.

The polar phase of the step a) can comprise one or several carbohydrate solutions. The carbohydrate solution refers to carbohydrates (one or several types) in solution and can further contain other compounds different from carbohydrates, such as vitamins, minerals, aromatic compounds, amino acids, essential oils, fiber and other molecules soluble and insoluble in the polar phase. These other compounds (different from carbohydrates) are not more than 3% (w/w) based on the dry residue of the final lyotropic composition.

In a particular embodiment of the invention, the carbohydrate solution is characterized in that the concentration of carbohydrates is greater than 45% by weight based on the dry residue of the carbohydrate solution) and said concentration is preferably 60% by weight based on the dry residue of the carbohydrate solution.

In a particular embodiment of the invention, the carbohydrate solution comprises glucose, fructose, saccharose, polyalcohols and/or other sugars applicable in the preparation of chocolate.

In a particular embodiment of step a), the carbohydrate source of the carbohydrate solution is honey and step a) comprises the following phases, carried out in the following order:
1) liquefaction of the honey,
2) cleaning of the compounds unrelated to the composition of the honey, and
3) pasteurization.

The objective of phases 1, 2 and 3 is to prevent the crystallization of the honey due to its high sugar content, more than 70% sugar in relation to the amount of water (normally less than 20%). An average composition of honey is 38.2% fructose, 31% glucose, 17.1% water, 7.2% maltose, 4.2% other sugars, 1.5% saccharose and 0.5% of other components different from carbohydrates such as minerals, vitamins and amino acids.

In a particular embodiment, the liquefaction of the honey in phase 1) is carried out at between 40 and 50° C., with gentle agitation, at between 5-15 rpm.

The cleaning phase 2) is performed to remove organic and inorganic solids unrelated to the composition of the honey, which could act as nuclei for the formation of crystals. In a particular embodiment, phase 2) is carried out by filtration through plate filters with a maximum pore size of 500 µm, preferably of 300 µm, at an approximate pressure of 2 Kg/cm$^2$ and at a temperature of 50° C. Likewise, the filtration can be performed by decantation or with plate centrifugation or supercentrifuges. The honey obtained must be free of organic and inorganic matter unrelated to the composition of the honey and the insoluble solid content must not be greater than 0.1 g per 100 g of honey.

In a particular embodiment of the present invention, phase 3) (pasteurization) is carried out at between 77 and 82° C., preferably 79° C., for 2 to 5 minutes, preferably 2 to 3 minutes. In general terms it can be stated that the pasteurized honey, product of phases 1, 2 and 3, can be stored at 4-10° C. for 2 years, at 25-27° C. for up to 6 months and at 27-45° C. for no more than one month.

When said pasteurized honey forms the carbohydrate solution of the polar phase, a final lyotropic composition with a honey flavor is obtained.

In another particular embodiment of step a), the carbohydrates of the carbohydrate solution come from fruit and step a) comprises the following phases:
i. extraction of the fruit juice by mechanical methods or by aqueous diffusion,
ii. rectification, and/or
iii. concentration,
wherein the order of phases ii) and iii) can be the given one or the reverse one, i.e., concentration and/or rectification.

The fruit is the group of edible fruits obtained from cultivated or wild plants. Depending on the starting fruit, mechanical methods or aqueous diffusion is used to obtain juices in phase i). Thus, mechanical methods are valid for obtaining juice from fleshy fruits such as for example apples, oranges, strawberries, etc and aqueous diffusion is necessary for carob beans, among others.

The juice obtained in phase i) is subsequently subjected to phase ii) and/or to phase iii) in one order or another (first phase ii) and/or then phase iii) or vice versa) according to whether the intention is to obtain concentrated juices; juices extracted with water and concentrated; concentrated and rectified juices; juices extracted with water, concentrated and rectified; rectified and concentrated juices; juices extracted with water, rectified and concentrated; or concentrated and rectified must. With the rectification processes (phase ii)), the partial or total removal of coloring substances, phenolic substances, salts and organic substances is essential. Likewise, it is convenient to remove the butyric acid and the tannins, impurities responsible for astringency. In the case of musts, it is important to stabilize them by means of adding sulfurous acid, therefore the latter must later be removed by means of desulfitation.

In a particular embodiment of phase ii), the rectification is carried out by means of the absorption with filtration aids, such as activated carbon, diatomaceous earths and zeolites, exchange resins, selective membranes (ultrafiltration, nanofiltration and reverse osmosis), for example macroporous membranes are used to purify the solution.

The concentration phase (phase iii)) is carried out using evaporation technologies such as vacuum evaporators.

The product obtained following these phases i), ii) and iii) is a syrupy liquid, with 45-83% soluble carbohydrates, mainly fructose and glucose, and other carbohydrates: mono-, di-, oligosaccharides and polyols, and natural aromatic compounds present in the fruit such as ethyl propionate and ethyl maltol.

Regardless of the carbohydrate source of step a), i.e., whether the carbohydrate solution is pasteurized honey product of phases 1-3, syrupy liquid product of phases i-iii, or another carbohydrate solution, if the percentage of carbohydrates in the carbohydrate solution is greater than 60%, the carbohydrate solution is preferably diluted by means of adding a polar solvent with conventional mixing systems, such as mechanical agitation (50 rpm), ultrasound or tubular static systems, at a temperature between 30 and 45° C. In a particular embodiment, the preparation of the polar phase is expressly carried out at a temperature of 45° C. and in another particular embodiment at 30° C.

Said polar solvents include water, aqueous solvents, hydroalcoholic mixtures, ethanol and organic solvents authorized for food use.

Preferably, when a hydroalcoholic solution, ethanol or another organic solvent is used as a solvent in the polar phase, the surfactant will be incorporated in the polar phase, whereas when the solvent in the polar phase is water, the surfactant will preferably be introduced in the fatty phase. Likewise, when the polar phase does not comprise a solvent, the surfactant will be incorporated in the fatty phase.

Ethanol is restricted for food use, but the use of a small amount of ethanol (approximately 5%) in food products is acceptable. Furthermore, when it is used in the process for preparing the lyotropic composition of the present invention, the alcohol evaporates, resulting in a virtually alcohol-free product.

In relation to step b), in a particular embodiment, the preparation of the fatty phase is carried out by means of static mixing in a tubular mixer or mechanically at 20-200 rpm, preferably at 40-50 rpm. In relation to the temperature, in a particular embodiment the preparation of the fatty phase is carried out at a temperature of 65° C. In another particular embodiment, at 40° C. and in another particular embodiment at a temperature 5° C. higher than the melting point of the fat.

In the fatty phase, different fats for food use, which can be of a vegetable origin, animal origin or mixtures of both, can be used. They are typically fats rich in polyunsaturated fatty acids such as oleic acid, linoleic acid or stearic acid; for example, cocoa butter, salt fat and others. Cocoa butter will preferably be used and optionally equivalent fats (fats compatible with cocoa butter), the legal limit of use of which is 5% for chocolate. For the manufacture of chocolate substitutes there are no legal restrictions in relation to the types of fats to be used.

To obtain the lyotropic composition of the present invention only one or several edible fats can be used, the melting point of which is lower than 50° C. Among them are included those specified in Table 1.

TABLE 1

List of some of the edible fats with a melting point lower than 50° C.

| Fat | Source | Melting point (° C.) |
|---|---|---|
| Butter fat | Cow's milk | 28-36 |
| Cocoa butter | Theobroma cacao | 30-35 |
| Salt fat | Shorea robusta | 28-39 |
| Lard | Sus scrofa domesticus | 28-48 |
| Palm oil | Elaeis guineensis | 24-30 |

The fats used in the present invention can be obtained by physical methods, hydraulic presses or expellers, or extractive methods, by means of using solvents authorized in food, and be used as such or purified by means of physicochemical refining processes. Said physical, extractive and physicochemical processes are widely known by the person skilled in the art. They include: filtration, degumming, neutralization, dehydration, decolorization, deodorization and winterization. These fats can optionally be hydrogenated and used as such or mixed with other fats.

In a particular and preferred embodiment of the present invention, the fatty phase comprises cocoa butter and/or lecithin and/or polyglycerol polyricinoleate.

In a particular embodiment of step c), the ratio in which the polar phase and the fatty phase are mixed is such that the ratio between the carbohydrate solution of the polar phase and the fatty phase varied in a range of 1:1 to 10:1 and preferably 2:1.

In a particular embodiment, the fatty phase and the polar phase are mixed for 2 hours. In another particular embodiment the agitation is carried out at between 100 and 600 rpm.

To remove the solvent by evaporation (step d)), any of the many existing evaporation systems known by the person skilled in the art in which mechanical agitation and evaporation under vacuum are simultaneously performed can be used. The agitated vacuum planetary evaporator (batch system) and the agitated thin film vacuum evaporator (continuous system) stand out among the most used systems.

In a particular embodiment of step d), batch evaporating systems are used, with an agitation of between 10-200 rpm, for less than 5 hours. The evaporation process has to be as quick as possible to prevent the polymerization of the sugars and the formation of crystals larger than 35 μm. The evaporation is preferably carried out for 2 hours.

In another particular embodiment of step d), the evaporation system is an agitated thin film vacuum evaporator, using a temperature less than 65° C. and a pressure less than 100 mbar, with agitation between 10 and 200 rpm and for a time less than thirty minutes.

In a particular embodiment of the process of the invention, step d) is carried out at a temperature 15° C. greater than the melting point of the fat used. In another particular embodiment of the process of the invention, step d) is carried out at a temperature less than 50° C. and in another particular embodiment, at a temperature less than 40° C. Moreover, in another particular embodiment, step d) is carried out at a pressure less than 50 mbar.

In relation to step e) of the method of the invention (adding a surfactant acting as an emulsifier), the surfactants used in the present invention can preferably be sucroglycerides, sucroesters, polyglycerol polyricinoleate and/or lecithin and/or mixtures thereof.

In the present invention, the term sucroglycerides designates the mixture of products obtained by transesterification of saccharose and of natural or synthesis triglycerides; these mixtures contain monoglycerides, diglycerides, triglycerides, monoesters and diesters of saccharose. The sucroglycerides contain between 40% and 60% saccharose esters of fatty acids and can be presented in a powder form.

In the terms of the present invention, sucroesters are understood as monoesters and diesters of saccharose obtained by the action of saccharose on a fatty acid which can contain from 12 to 20 carbon atoms (of the same type as those used to prepare the sucroglycerides) or by the separation of sucroglycerides. The sucroesters can be presented in paste form or in powder form.

Polyglycerol polyricinoleate (PGPR) is prepared by the esterification of polyglycerol with condensed castor-oil plant fatty acids. The fraction of polyglycerols is formed by no less than 75% di-, tri- and tetraglycerols and contains no more than 10% polyglycerols equal to or greater than heptaglycerol.

Lecithin is obtained for food uses from seed oil (particularly from *Glycine* genus soybean seeds and *Helianthus* genus sunflower seeds) and from egg yolk. Lecithin is a complex mixture of phospholipids and other components. It can be found in the literature named as 1,2-diacyl-snglycero-3-phosphocholine. The composition of lecithin and therefore its physical properties vary enormously depending on the source and the degree of purification.

In a particular embodiment, the added surfactant is PGPR, PGPR and lecithin, or sucroesters and lecithin. The surfactant can be metered by means of metering pumps and the product is subsequently transferred to the storage tanks, in which the perfect mixing of the surfactant will be assured by means of gentle mechanical agitation (50-100 rpm). The product obtained in this phase is already the lyotropic composition of the invention, however it is optional although recommendable to carry out the tempering step to achieve a product in the suitable dispatch and preservation conditions.

For the tempering of the lyotropic composition, the two general tempering systems can be used: continuous or multi-stage temperers and batch temperers, in the same conditions of the original fat. The great difference is the working system, although as any person skilled in the art knows, there are multiple possibilities within each group. Briefly, when continuous temperers are used, the lyotropic composition is gradually metered by means of a feeding pump, normally located at the lower part, at approximately a temperature 8° C. above the melting point of the starting fat. The lyotropic composition rises through the cooling areas, in which the cooling controls regulate the rising speed. Thus, the lyotropic composition is cooled to 5° C. below the melting point of the fatty phase. In the final phase, the lyotropic composition is slightly heated and its temperature is raised to its melting point, achieving a lyotropic composition with a fine and homogeneous structure. In these continuous systems, the total residence time can range from 10 to 360 minutes.

Large thermoregulated agitated vessels, among others, are used as batch temperers. The lyotropic composition enters into a liquid state and by means of mechanical stresses (agitation between 80 and 125 rpm) and cooling through the thermoregulated jacket, the lyotropic composition is cooled to 5° C. below the melting point of the fatty phase. The temperature is subsequently raised to its melting point, achieving a lyotropic composition with a fine and homogeneous structure.

Subsequently, whichever the tempering equipment used, the lyotropic composition is directly used as an intermediate for the preparation of food products or it is cooled to the storage temperature, between 4-10° C., thus achieving the satisfactory degree of stability for dispatching and preserving the product. If the lyotropic composition is subsequently to be used in a liquid phase, it is melted and maintained under agitation at 20 $h^{-1}$, at a temperature 5° C. above the melting point of the fatty phase until its use. For example, in the event that the fatty phase is cocoa butter or equivalent fats, the lyotropic composition is melted at temperatures greater than 34° C. and provisionally maintained in vats heated at about 40° C. and under agitation at 20 $h^{-1}$, until its use.

The behavior of the resulting lyotropic composition is very similar, generally speaking, to that of the original fat, so the same types of storages and tanks can be used.

Finally, the use of the lyotropic composition of the invention as an intermediate in the production of different food products is also an object of the present invention. The composition object of the present invention can act as a sweetening agent, for example, it can easily be added to margarines, butters and other edible oils in a wide range of concentrations. Additionally, the lyotropic composition of the invention can be used as a carrier of water, flavors and/or other components to a fatty phase, such that the profile of the final products is positively modified. Thus, the lyotropic composition of the invention can act as a carrier of apple flavor, carob bean flavor, apricot flavor, pineapple flavor, cherry flavor and/or strawberry flavor, among others. It can also be incorporated in the process for preparing chocolates or chocolate substitutes. Among them, it is worth mentioning obtaining chocolates which contain, in addition to the traditional ingredients of chocolate, honey and/or fruit juices as the carbohydrate source, the sole source or combined with other carbohydrate sources, and which therefore maintain part of the original flavors of the honey and/or the fruit respectively.

In this respect, the method for incorporating the lyotropic composition of the invention in the process for preparing chocolate or chocolate substitutes is also an object of the present invention. Said method is characterized by comprising the following phases:

A) preparing the lyotropic composition of the invention,
B) mixing for 20-30 minutes, at 40-50° C. and at 30-50 rpm the lyotropic composition with chocolate, or with the ingredients of chocolate, except the sugars, ground and/or refined.

In particular, chocolates or chocolate substitutes with a honey flavor can be obtained if the lyotropic composition has honey as the carbohydrate source, said honey being able to be monofloral or multifloral. Likewise, chocolates or chocolate substitutes with fruit flavors can be obtained, either single-variety or multi-variety, according to whether the carbohydrate source is one type of fruit or several types of fruits. In this respect, it should be emphasized that chocolates or chocolate substitutes with fruit flavors which are difficult to obtain by means of flavoring with natural flavors can be obtained.

The mentioned step A) is carried out following the process described above for preparing the lyotropic composition object of the present invention.

In relation to step B) there are three particular embodiments in relation to what the lyotropic composition is mixed with. In one of them, the lyotropic composition is mixed with chocolate, either one chocolate or a mixture of chocolates. In another one, it is mixed with the ingredients of chocolate which include cocoa powder, cocoa paste, and others, although not the ground and/or refined sugars. And in another one, it is mixed with the ingredients of chocolate, except the sugars, ground and/or refined and mixed at between 60° C. and 75° C., for between 5 minutes and 480 minutes. The mixing of these ingredients at one temperature or another depends on whether or not there is any milk compound among them. If there is the temperature of 60° C. is used, otherwise the mixing can be performed at up to 75° C.

The grinding of the different ingredients of chocolate can be carried out individually, each ingredient separately, or jointly, grinding the mixture of several ingredients. The technologies for grinding these ingredients are known by the person skilled in the art and are widely described in the state of the art, for example, in Beckett 1994. So, some pieces of grinding equipment are: roller refiners, disc refiners (abrasion), colloid mills, perforated-plate mill, bead mill, hammer mill, needle mill, vibrating mill, sand mill and fluid-energy mill. The grinding step for an ingredient can result from the combination of two grinding steps, for example, pre-grinding in a colloid mill and subsequently grinding by means of a bead mill.

In the three particular embodiments of step B), the mixing of the lyotropic composition and the remaining ingredients of chocolate or the chocolate is performed at moderate temperatures, 10° C. above the melting point of the fatty phase of the lyotropic composition. The mixing can be performed continuously by means of static mixers, for example tubular mixers, or in batches, by means of agitated mixers. The mixing time varies enormously depending on the system used, it can range from 10 seconds to 5 hours. In any case, the mixing parameters (gentle mechanical agitation (approximately 100 rpm) and moderate temperatures) do not destroy the flavors introduced by means of the lyotropic composition. Thus, the lyotropic chocolate obtained has the special flavors of the lyotropic composition, such as notes of honey or fruits. Moreover, since this process for preparing chocolate or chocolate substitutes can be carried out continuously, it can be carried out in a more mechanical manner and requires less expensive and bulky installations than those used in the preparation of chocolate by the conventional process, in which the product enters by means of loads into the conche.

Finally, like any chocolate, the lyotropic chocolate is tempered such that when it is cooled and heated in a controlled manner by means of the tempering processes typical of chocolate and widely known by the person skilled in the art, a correct crystallization of the butter is achieved. This will provide the chosen shine and texture, as well as the stability required for its storage.

EXAMPLES

A series of examples is described below which illustrate the present invention but do not limit its scope in any way.

Example 1

Preparation of a Lyotropic Composition from Fruit Juices Extracted with Water, Rectified and Concentrated The polar phase is prepared by mixing 1336 g of carbohydrate solution, in this case fruit juice extracted with water, rectified and concentrated, the composition of which has 80% carbohydrates and 20% water, with 312 g of water. This mixture is carried out at 30° C. by means of gentle mechanical agitation, 50 rpm.

The fatty phase is prepared by mixing 650 g of cocoa butter with 9 g of soy lecithin and 9 g of polyglycerol polyricinoleate (PGPR). This mixture is carried out at 40° C. by means of gentle mechanical agitation, 50 rpm.

The fatty phase and the polar phase are mixed with agitation at 600 rpm for one minute at 42° C. The product of said mixture is maintained at a temperature of 34° C.-42° C.

The removal of the solvent by evaporation is carried out by continuous addition to a jacketed planetary concentrator at 50° C. and an absolute pressure close to 50 mbar. At the beginning, the pressure increases slightly to 75 mbar. At the end of the process, the pressure is between 30-18 mbar. The evaporation lasts 2 hours and 502 mL of the solvent are collected, for which there must be a suitable condensation system. The lyotropic concentrate resulting from the removal of the solvent has a moisture of 4.3%. During the entire evaporation process, an agitation at 200 rpm is maintained.

The agitation is subsequently lowered to 50 rpm, another 9 g of PGPR are added to the lyotropic concentrate and the product is transferred to the storage tanks, in which the perfect mixing of the emulsifier will be assured by means of gentle mechanical agitation (50 rpm). The product obtained is stored under agitation in a liquid phase 20 $h^{-1}$ at a temperature of 40° C. until its tempering.

At the beginning of the tempering, the lyotropic concentrate is heated to 45° C., being in a liquid state. A stepped cooling is subsequently applied. As it cools to 26-28° C., fatty crystals of all types are gradually formed. When the temperature is raised to 28-31° C., the unstable crystals melt, only the stable ones remaining. These stable crystals act as crystallization nuclei, whereby when they gradually cool, all the crystals which are formed are stable. By maintaining the storage temperature between 4-10° C., the satisfactory degree of stability for dispatching and preserving the lyotropic composition is finally achieved.

When the lyotropic compositions described in this paragraph are to be used in liquid phase, they are melted at temperatures greater than 36° C. and are provisionally maintained stored in vats heated at a temperature of 40° C. and agitated at 20 $h^{-1}$, until their use.

The composition of the final lyotropic composition is 58.6% carbohydrates, 55% of which are the sum of the monomers fructose and glucose, 35.6% cocoa butter, 4.3% water, 1.0% PGPR and 0.5% lecithin.

Example 2

Preparation of a Lyotropic Composition from Fruit Juice, Rectified and Concentrated, Using Ethanol as a Solvent In a planetary mixer-concentrator provided with a vacuum system, a solvent condensation column and an agitation system, 2706 g of fruit juice, rectified and concentrated, the composition of which is: 63.6% carbohydrates, 0.1% aromatic compounds, 0.2% minerals and 36% water, are mixed with 200 mL of 96° ethanol. This mixing is carried out for 30 minutes at 45° C. by means of mechanical agitation at 50 rpm. 20.5 g of lecithin are added to the solution and the agitation is maintained for 5 minutes.

On the other hand, the fatty phase is prepared by mixing 294.5 g of cocoa butter (*theobroma* cocoa) and 15.5 g of salt fat (*shorea robusta*) at 50° C. with agitation at 40 rpm.

The fatty phase is added to the polar phase and they are mixed for 30 minutes at 45° C. by means of mechanical agitation at 100 rpm.

The removal of the solvent by evaporation is carried out in the same jacketed planetary mixer-concentrator at a temperature of 50° C., with agitation at 200 rpm and an absolute pressure less than 300 mbar. The evaporation lasts 2 hours and 1022 mL of the solvent are collected, for which there must be a suitable condensation system. The lyotropic concentrate resulting from the removal of the solvent has a moisture of 6.8%.

Subsequently, 15 g of PGPR are added to this product, it is tempered (as has been specified in Example 1), maintaining the agitation at 100 rpm and it is unloaded at a temperature of 30.4° C. The composition of the final product is 77.4% carbohydrates, 13.2% cocoa butter, 6.8% water, 0.7% PGPR, 0.9% lecithin, 0.7% salt fat, 0.2% mineral compounds and 0.1% aromatic compounds.

Example 3

Preparation of the Lyotropic Composition from a Composition with Equal Parts of Fruit Juice (Rectified and Concentrated) and Fruit Juice Extracted with Water (Concentrated and Rectified) Using Sucroesters as an Emulsifier The polar phase is prepared, which consists of mixing 1336 g of a composition with equal parts of fruit juice, rectified and concentrated, and fruit juice extracted with water, concentrated and rectified, the composition of which has 82% carbohydrates, 66% of which are the sum of the monomers fructose and glucose, and 18% water with 312 g of water. This mixing is carried out at 30° C. by means of gentle mechanical agitation, 50 rpm.

The fatty phase is prepared by mixing 650 g of cocoa butter with 9 g of soy lecithin, by means of gentle mechanical agitation, 50 rpm, at 40° C.

The fatty phase and the polar phase are mixed with agitation at 600 rpm for one minute at 42° C., resulting in a product which must be maintained at temperature between 34° C. and 42° C.

The removal of the solvent by evaporation is carried out by continuous addition to a jacketed planetary concentrator at 50° C. and an absolute pressure close to 50 mbar. At the beginning, the pressure increases slightly to 75 mbar. At the end of the process, the pressure is between 30-18 mbar. The evaporation lasts 2 hours and 475 mL of the solvent are collected, for which there must be a suitable condensation system. The lyotropic concentrate resulting from the removal of the solvent has a moisture of 4.2%. During the entire evaporation process, it is maintained under agitation at 200 rpm.

The agitation is subsequently lowered to 50 rpm, another 18 g of a sucroester powder preparation with a content of 70% monoesters are added and the product is transferred to the storage tanks, in which the perfect mixing of the emulsifier will be assured by means of gentle mechanical agitation (100 rpm). The product obtained is tempered as in Example 1 and unloaded at a temperature of 30.1° C. The lyotropic composition obtained is stored under refrigeration at temperatures ~10° C. such that it solidifies. The product derived from this process can be melted and tempered without observing any loss of quality. The composition of the final product is 59.2% carbohydrates, 4.2% water, 35.1% butter, 1.0% sucroesters and 0.5% lecithin.

Example 4

Preparation of a Lyotropic Composition from Fruit Juices Extracted with Water, Rectified and Concentrated The polar phase is prepared by heating 1787.8 g of carbohydrate solution, in this case fruit juice extracted with water, rectified and concentrated, the composition of which has 59.8% carbohydrates and 40.2% water, at 30° C. by means of gentle mechanical agitation, 50 rpm.

The fatty phase is prepared by mixing 650 g of cocoa butter with 9 g of soy lecithin and 9 g of polyglycerol polyricinoleate (PGPR). This mixture is carried out at 40° C. by means of gentle mechanical agitation, 50 rpm.

The fatty phase and the polar phase are mixed with agitation at 600 rpm for one minute at 42° C. The product of said mixture is maintained at a temperature of 34° C.-42° C.

The removal of the solvent by evaporation is carried out by continuous addition to a jacketed planetary concentrator at 50° C. and an absolute pressure close to 50 mbar. At the beginning, the pressure increases slightly to 75 mbar. At the end of the process, the pressure is between 30-18 mbar. The evaporation lasts 2.7 hours and 639 mL of water are collected, for which there must be a suitable condensation system. The lyotropic concentrate resulting from the removal of the solvent has a moisture of 4.4%. During the entire evaporation process, an agitation at 200 rpm is maintained.

The agitation is subsequently lowered to 50 rpm, another 9 g of PGPR are added to the lyotropic concentrate and the product is transferred to the storage tanks, in which the perfect mixing of the emulsifier will be assured by means of gentle mechanical agitation (50 rpm). The product obtained is stored under agitation in a liquid phase 20 $h^{-1}$ at a temperature of 40° C. until its tempering.

At the beginning of the tempering, the lyotropic concentrate is heated to 45° C., being in a liquid state. A stepped cooling is subsequently applied. As it cools to 26-28° C., fatty crystals of all types are gradually formed. When the temperature is raised to 28-31° C., the unstable crystals melt, only the stable ones remaining. These stable crystals act as crystallization nuclei, whereby when they gradually cool, all the crystals which are formed are stable. By maintaining the storage temperature between 4-10° C., the satisfactory degree of stability for dispatching and preserving the lyotropic composition is finally achieved.

When the lyotropic compositions described in this paragraph are to be used in liquid phase, they are melted at temperatures greater than 36° C. and are provisionally maintained stored in vats heated at a temperature of 40° C. and agitated at 20 $h^{-1}$, until their use.

The composition of the final lyotropic composition is 58.5% carbohydrates, 58% of which are the sum of the monomers fructose and glucose, 35.6% cocoa butter, 4.4% water, 1.0% PGPR and 0.5% lecithin.

Example 5

Preparation of a Lyotropic Composition from Honey

Harvested rosemary honey is stored at less than 10° C. and after two days it is melted and maintained for a period less than 2 days in agitated tanks, at 5 rpm and 45° C.

The honey is subsequently filtered through heat-insulated plate filters with a filter pore size of 300 µm, at a pressure of approximately 2 Kg/cm$^2$ and at 50° C. The filtered honey is accumulated in a tank feeding a plate heat exchanger in which the product is subjected to a heat treatment at 79° C. for 2 minutes and 50 seconds, obtaining a pasteurized honey.

The polar phase is prepared by mixing 1100 g of said pasteurized rosemary honey, the composition of which has 84% carbohydrates and 16% water, with 245 g of water. This mixing is carried out at 30° C. by means of gentle mechanical agitation, 50 rpm.

The fatty phase is obtained by mixing 510 g of cocoa butter with 7 g of lecithin. This mixing is carried out at 40° C. by means of gentle mechanical agitation, 50 rpm.

The fatty phase and the polar phase are mixed with agitation at 600 rpm for one minute at 42° C., resulting in a mixture which must be maintained between 34° C. and 42° C.

The removal of the solvent by evaporation is carried out by continuous addition to a jacketed planetary concentrator at 50° C. and an absolute pressure close to 50 mbar. At the beginning, the pressure increases slightly to 75 mbar. At the end of the process, the pressure is between 30-18 mbar. The evaporation lasts 2 hours and 364 mL of the solvent are collected, for which there must be a suitable condensation system. The lyotropic concentrate resulting from the removal of the solvent has a moisture of 4.5%. During the entire evaporation process, it is maintained under agitation at 200 rpm.

The agitation is subsequently lowered to 50 rpm, another 17 g of PGPR are added to the lyotropic concentrate and the product is transferred to the storage tanks, in which the perfect mixing of the emulsifier will be assured by means of gentle mechanical agitation (100 rpm). The product obtained is tempered as in Example 1 and unloaded at a temperature of 30.8° C.

The lyotropic composition obtained is stored under refrigeration at about 10° C. such that it solidifies. The product derived from this process can be melted and tempered without observing any loss of quality. The composition of the final product is 60.2% carbohydrates, 33.4% butter, 4.5% water, 1.1% PGPR, 0.5% lecithin and 0.4% other components of the honey different from carbohydrates, such as vitamins, minerals and proteins.

Example 6

Preparation of a Lyotropic Composition from Honey

The pasteurized rosemary honey is obtained as in Example 5.

The polar phase is prepared by mixing 1100 g of pasteurized rosemary honey, the composition of which has 84% carbohydrates and 16% water, with 245 g of water. This mixing is carried out at 30° C. by means of gentle mechanical agitation, 50 rpm.

The fatty phase is obtained by mixing 510 g of cocoa butter with 6.7 g of lecithin and 8.4 g PGPR. This mixing is carried out at 40° C. by means of gentle mechanical agitation, 50 rpm.

The fatty phase and the polar phase are mixed with agitation at 600 rpm for one minute at 42° C., resulting in a mixture which must be maintained at between 34° C. and 42° C.

The removal of the solvent by evaporation is carried out by continuous addition to a jacketed planetary concentrator at 50° C. and an absolute pressure close to 50 mbar. At the beginning, the pressure increases slightly to 75 mbar. At the end of the process, the pressure is between 30-18 mbar. The evaporation lasts 2 hours and 364 mL of the solvent are collected, for which there must be a suitable condensation system. The lyotropic concentrate resulting from the removal of the solvent has a moisture of 3.7%. During the entire evaporation process, it is maintained under agitation at 200 rpm.

The agitation is subsequently lowered to 50 rpm, another 9 g of PGPR are added to the lyotropic concentrate and the product is transferred to the storage tanks, in which the perfect mixing of the emulsifier will be assured by means of gentle mechanical agitation (100 rpm). The product obtained is tempered as in Example 1 and unloaded at a temperature of 30.4° C.

The lyotropic composition obtained is stored under refrigeration at about 10° C. such that it solidifies. The product derived from this process can be melted and tempered without observing any loss of quality. The composition of the final product is 60.6% carbohydrates, 33.6% butter, 3.7% water, 1.1% PGPR, 0.5% lecithin and 0.4% other components of the honey different from carbohydrates, such as vitamins, minerals and proteins.

Example 7

Preparation of Chocolate with Honey

The lyotropic composition from rosemary honey is prepared according to Examples 5 or 6.

In parallel, the cocoa paste (13.5% s/t) is refined, together with atomized milk power with 26% fat (18.4% s/t), using a three-cylinder refiner, in two passes at a roller pressure of 80 bar. The s/t percentage hereinafter refers, unless otherwise indicated, to the percentage of solid in the total final chocolate. This paste is mixed in the mixer at 60° C. for 5 hours together with cocoa butter (8.45% s/t) and milk fat (5% s/t).

The lyotropic composition (54.5% s/t) is added to the product obtained from said mixture, and a mixing is carried out for 20 minutes at 45° C. and an average speed of 30 rpm in a planetary mixer. The chocolate obtained is tempered by means of a temperature decrease maintaining an agitation of 200 rpm, the unloading temperature being 29.4° C. A chocolate with notes of honey is thus achieved.

Example 8

Preparation of Chocolate with Honey from Dark Chocolate

The lyotropic composition from rosemary honey is prepared according to Example 5 or 6.

Said lyotropic composition (74.5% s/t) is added to dark chocolate with a composition of 80.5% cocoa (25.5% s/t) maintained at 45° C., and a mixing is carried out for 20 minutes at 45° C. and an average speed of 30 rpm in a planetary mixer. The chocolate obtained is tempered, by means of a temperature decrease maintaining an agitation of 200 rpm, the unloading temperature being 30.1° C. A dark chocolate with notes of honey is thus achieved.

Example 9

Preparation of Fruity Chocolate

The lyotropic composition from fruit juices extracted with water, rectified and concentrated is prepared according to Example 1.

In parallel, 1268 g of cocoa paste, with 54% cocoa butter, are mixed with 706 g of cocoa powder with 10-12% fat in a heated planetary mixer with a capacity of 12 L. The temperature of the mixture is approximately 75° C. A plastic mass is formed, which is subsequently refined in a three-cylinder refiner in two steps carried out continuously. In the first refining, the rollers subject the paste to a pressure of 80 bar and in the second refining to 100 bar. Between operations, the mass is maintained in the planetary mixer under agitation at 60 rpm and at a temperature of 70° C. Butter is added to the doubly refined product, up to 10% by weight based on the final product, thus fluidizing the refined mass. It is subsequently homogenized in the planetary mixer for 5 hours at an approximate temperature of 75° C. and is then maintained at 45° C.

The lyotropic composition (50% s/t) is added to said mass, and a mixing is carried out for 20 minutes at 45° C. and an average speed of 30 rpm in a planetary mixer. The chocolate obtained is tempered, by means of a temperature decrease maintaining an agitation of 200 rpm, the unloading temperature being 30.4° C. A fruity chocolate is thus achieved.

LITERATURE

Baba, H., Kamuro Y., Tashiro Y. (1992) U.S. Pat. No. 5,120,566.

Beckett S. (1994). *Industrial chocolate manufacture and use*, Editorial: Blackie and Son limited, Bishopbriggs, Glasgow.

Beckett S., (2000). *The science of chocolate*. RSC Paperbacks, Cambridge.

Salager J. L., Antón R., Anderez J., Aubry J. M. (2001) *Formulación de Microemulsiones por el Método del HLD*. Techniqie de l'Ingénieur, Vol. Génie des Procédés, J2 157, 1-20. Schlup R, Lioutas T. S. (1995) U.S. Pat. No. 5,468,509.

The invention claimed is:

1. A process of manufacturing an edible lyotropic composition, the process comprising:
   a) preparing a polar phase comprising a carbohydrate solution wherein the carbohydrate solution is prepared by mixing a carbohydrate with a polar solvent, and wherein the origin of the carbohydrate is honey, a fruit, or a mixture of fruits;
   b) preparing separately a fatty phase comprising mixing a fat or a mixture of fats and at least one surfactant, wherein the surfactant is selected from the group consisting of lecithin, polyglycerol polyricinoleate (PGPR), and a sucroester, and wherein the fat or the mixture of fats has a melting point of less than 50° C.;
   c) combining the fatty phase prepared in step b) and the polar phase prepared in step a), by means of agitation at between 20 and 700 rpm, at a temperature of 30° C. to 50° C., and for a time of 30 to 36000 seconds, wherein the ratio between the carbohydrate solution of the polar phase and the fatty phase is of 1:1 to 20:1,
   d) evaporating the polar solvent from the product obtained in step c) under vacuum at a pressure less than 300 mbar, at a temperature less than 65° C. and with agitation between 10 and 200 rpm, thereby obtaining a concentrated product, and
   e) adding an emulsifier to the concentrated product obtained in step d), and mixing to obtain the lyotropic composition,
   wherein the lyotropic composition is stable between 4° C. and 25° C. and comprises
      (i) carbohydrates selected from mono-, di-, trisaccharides and/or polyalcohols in a proportion greater than 40% by weight,
      (ii) surfactants at a concentration of 0.01% to 4% by weight, and
      (iii) a moisture content of 2% to 10%, the percentages by weight referring to the lyotropic composition.

2. The process according to claim 1, wherein in step e) the emulsifier is selected from the group consisting of lipoproteins, phospholipids, monoglycerides and diglycerides, propylene glycol esters of fatty acids, glyceride esters of fatty acids, sorbitan esters, sucroglycerides, sucroesters, polyglycerol polyricinoleate, lecithin, and mixtures thereof.

3. The process according to claim 1, wherein in step a) the carbohydrate source of the carbohydrate solution is honey and step a) comprises the following steps in the following order:
   1) liquefaction of the honey,
   2) cleaning of the compounds unrelated to the composition of the honey, and
   3) pasteurization.

4. The process according to claim 1, further comprising:
   mixing the lyotropic composition obtained in step e) with chocolate or with ingredients of chocolate, excluding ground and/or refined sugars, for 10 seconds to 5 hours at a temperature 10° C. above the melting point of the fatty phase of the lyotropic composition obtained in step e) to obtain a chocolate or a chocolate substitute.

5. The process according to claim 1, wherein the surfactant comprises polyglycerol polyricinoleate (PGPR) or a mixture of polyglycerol polyricinoleate (PGPR) and lecithin.

6. The process according to claim 1, wherein the emulsifier comprises polyglycerol polyricinoleate (PGPR) or a mixture of polyglycerol polyricinoleate (PGPR) and lecithin.

7. The process according to claim 1, further comprising:
   mixing the lyotropic composition obtained in step e) with chocolate or with ingredients of chocolate, excluding ground and/or refined sugars, for 20-30 minutes, at 40-50° C. and at 30-50 rpm, to obtain a chocolate or a chocolate substitute.

8. The process according to claim 1, wherein the carbohydrate source of the carbohydrate solution is fruit and step a) comprises the following steps:
   i) extraction of the fruit juice by mechanical methods or by aqueous diffusion,
   ii) rectification, and/or
   iii) concentration,
   wherein the order of steps ii) and iii) can be the given one or the reverse one.

* * * * *